United States Patent Office 2,794,816
Patented June 4, 1957

---

2,794,816

RECOVERY OF HYDROCORTISONE

Kingsley M. Mann, Kalamazoo Township, Kalamazoo County, Herman A. Drake, Galesburg, and Douglas E. Rayman, Vicksburg, Mich., assignors to The Upjohn Company, Kalamazoo, Mich., a corporation of Michigan No Drawing. Application November 26, 1954,
Serial No. 471,514

4 Claims. (Cl. 260—397.45)

The present invention relates to a process for the separation of steroid mixtures particularly the mixtures resulting from biological oxidation of 17α,21-dihydroxy-4-pregnene-3,20-dione and is more particularly concerned with the separation and recovery of 11β,17α,21-trihydroxy-4-pregnene-3,20-dione (hydrocortisone or Kendall's compound F) from a mixture with 17α,21-dihydroxy-4-pregnene-3,20-dione (Reichstein's substance S) such as results from the oxidation of 17α,21-dihydroxy-4-pregnene-3,20-dione by microorganisms.

The prior art discloses several processes, directed to the production of 11β,17α,21-trihydroxy-4-pregnene-3,20-dione, which use as starting substance the readily available 17α,21-dihydroxy-4-pregnene-3,20-dione. In these processes 17α,21-dihydroxy-4-pregnene-3,20-dione (substance S) is brought into contact with microorganisms, illustratively *Curvularia lunate,* U. S. Patent 2,658,023; *Streptomyces fradiae,* J. Am. Chem. Soc. 74, 2381 (1952) or *Cunninghamella blakesleeana* U. S. Patent 2,602,769, and the like, which oxidize 17α,21-dihydroxy-4-pregnene-3,20-dione to 11β,17α,21-trihydroxy-4-pregnene-3,20-dione. Since these oxidations are never complete, some of the starting material remains in the reaction mixture. Furthermore other oxygenated derivatives of the starting material may occur, illustratively cortisone (compound E) and materials more or less polar than hydrocortisone and cortisone which are produced when substance S is contacted with organisms of the genera Cunninghamella, Streptomyces or Curvularia. In the processes described in Patents 2,658,023 and 2,602,769, the desired 11β,17α,21-trihydroxy-4-pregnene-3,20-dione is separated from the reaction mixture by repeated extractions followed by chromatography in a column packed with a suitable solid material and development of the column. Such a procedure is cumbersome and expensive due to the large amounts of organic solvents necessary and the time involved in the development of the column and is thus generally unsuitable for large scale industrial production.

The present invention overcomes the above-described difficulties by using a solvent selected from the group consisting of ethylene dichloride and mixtures of ethylene dichloride and methanol containing up to ten percent by volume of methanol to separate the 11β,17α,21-trihydroxy-4-pregnene-3,20-dione from 17α,21-dihydroxy-4-pregnene-3,20-dione.

While chlorinated hydrocarbon alone or in the presence of other solvents have been suggested or have been used for the extraction of steroids resulting from a microbiological oxidation, these solvents have never been found suitable for the separation and recovery of 11β,17α,21-trihydroxy-4-pregnene-3,20-dione without necessitating the additional use of a chromatographic column.

In the instant invention however the 11β,17α,21-trihydroxy-4-pregnene13,20-dione is separated from the solid mixture containing 11β,17α,21-trihydroxy-4-pregnene-3,20-dione, 17α,21-dihydroxy-4-pregnene-3,20-dione, various other steroids illustratively cortisone and other oxygenation and reduction products of S, and metabolic products by extracting this mixture with a solvent selected from the group consisting of ethylene dichloride and mixtures of ethylene dichloride and methanol containing up to ten percent by volume of methanol, followed by cooling and filtration of the precipitated 11β,17α,21-trihydroxy-4-pregnene-3,20-dione.

It is an object of the present invention to provide a simplified, economic method to separate and recover 11β,17α,21-trihydroxy-4-pregnene-3,20-dione from a mixture containing 17α,21-dihydroxy-4-pregnene-3,20-dione. It is particularly an object of the present invention to provide a method for the separation of 11β,17α,21-trihydroxy-4-pregnene-3,20-dione from a mixture obtained from the oxidation of 17α,21-dihydroxy-4-pregnene-3,20-dione by microorganisms, wherein the use of chromatographic columns is avoided. Other objects of the present invention will be apparent to those skilled in the art to which this invention pertains.

The starting materials of the present invention are crude solid mixtures consisting of hydrocortisone, 17α,21-dihydroxy-4-pregnene-3,20-dione and other oxidation and reduction products of 17α,21-dihydroxy-4-pregnene-3,20-dione, illustratively, cortisone together with material of greater or lesser polarity than either 17α,21-dihydroxy-4-pregnene-3,20-dione or 11β,17α,21-trihydroxy-4-pregnene-3,20-dione (hydrocortisone) and metabolic products produced by the selected species of microorganisms. The amount of hydrocortisone in the mixture commonly varies between about twenty to about 75 percent and is usually between about forty and about sixty percent. The amount of residual 17α,21-dihydroxy-4-pregnene-3,20-dione is usually between about zero to about twenty percent and most commonly is found to be between about five and about ten percent. The thus-described mixture may be obtained by various methods, illustratively by filtering the reaction mixture resulting from fungus biooxidation to remove the mycelium and suspended solids, extracting the filtrate with organic solvents, preferably by a countercurrent Podbielniak extractor with ethyl acetate, concentrating the thus obtained ethyl acetate solution in vacuo at low temperatures to obtain a cake, and extracting the cake with a hydrocarbon solvent such as petroleum ether, Skellysolve B (a mixture of hexanes), to remove a large proportion of fats.

In carrying out the process of the present invention the mixture containing 11β,17α,21-trihydroxy-4-pregnene-3,20-dione, 17α,21-dihydroxy-4-pregnene-3,20-dione and other steroids produced by oxidation or reduction of 17α,21-dihydroxy-4-pregnene-3,20-dione, illustratively cortisone, as well as some remaining fat and fatty acid derivatives is dissolved in a solvent selected from the group consisting of ethylene dichloride and mixtures of ethylene dichloride with up to ten volume percent of methanol. The ratio of solvent to solid mixture used is based on the content of 11β,17α,21-trihydroxy-4-pregnene-3,20-dione in the mixture as determined by quantitative chromatography of a small sample of the crude mixture. Thus, if ethylene dichloride alone is employed, about one liter of solvent is used for each fourteen grams of 11β,17α,21-trihydroxy-4-pregnene-3,20-dione in the mixture, while if ethylene dichloride with methanol is used, about one liter of solvent is used for each forty grams of 11β,17α,21-trihydroxy-4-pregnene-3,20-dione in the mixture. In any event the total amount of solvent is suitably large enough to produce essentially total dissolution of the mixture at an elevated temperature, for example, at the boiling point of the solution. The thus-obtained solution is then filtered and subsequently cooled. Cooling may be produced by refrigeration, cold water and/or ice. If the cold water is inadequate to cool the solution more cooling can be achieved by volatilizing some of the solvent through application of a vacuum. A convenient temperature range for crystallization is from minus twenty to plus twenty degrees centigrade, preferably between minus fifteen to plus ten degrees centigrade. In order to facilitate crystallization of hydrocortisone, mechanical stirring may be utilized. However, crystallization proceeds without stirring. After the crystallization is terminated, the solution containing the precipitated hydrocortisone is filtered, and the crystals are dried to furnish 92 to 98 percent pure hydrocortisone.

The following examples are illustrative of the process and products of the present invention, but are not to be construed as limiting.

Example 1

33.36 grams of a mixture containing 10.47 grams of hydrocortisone, 3.83 grams of cortisone and 1.38 grams of 17α,21-dihydroxy-4-pregnene-3,20-dione were admixed with 700 milliliters of ethylene dichloride and refluxed for ten minutes. The thus obtained solution was filtered while hot and then chilled to five degrees centigrade. The resulting crystals were separated by filtration and dried to yield 7.007 grams of hydrocortisone which was 93.2 percent pure.

Example 2

713.6 grams of a mixture containing 344.7 grams of hydrocortisone and 149.8 grams of cortisone were dissolved in 26 liters of ethylene dichloride at reflux temperature. After the material had essentially passed into solution, the solution was filtered with Celite diatomaceous earth filter-aid and the thus obtained clear filtrate was cooled with cold water and stirred for eighteen hours. To further cool the solution to about ten degrees centigrade one liter of ethylene dichloride was removed by placing the solution under a vacuum and supplying no heat. The thus obtained crystals were removed and dried at forty to fifty degrees centigrade at 28 inches of vacuum to yield 309 grams of material which was shown to be 92.4 percent hydrocortisone as determined by quantitative paper chromatography. The following physical constants were found: Melting point 217 to 218 degrees centigrade; specific rotation $[\alpha]_D$ of plus 169 degrees; $E_{242}$ of 15,750; ash of 0.02 percent and moisture of 0.5 percent.

Example 3

Four grams of a mixture containing 71 percent hydrocortisone and seven percent cortisone were dissolved in 75 milliliters of ethylene dichloride and seven milliliters of methanol, the mixture was heated, filtered and chilled. 1.9 grams of hydrocortisone was obtained from the subsequent filtration. This product contained 96.8 percent of hydrocortisone and melted at 217 to 218 degrees centigrade.

Example 4

Nine thousand six hundred and seventy-four (9,674) grams of a crude mixture containing, as determined by paper chromatography, 4.982 grams of hydrocortisone, 1548 grams of cortisone, and 774 grams of 17α,21-dihydroxy-4-pregnene-3,20-dione were dissolved in a mixture consisting of 130 liters of ethylene dichloride and twelve liters of methanol. The mixture was heated, filtered, and chilled to minus thirteen degrees centigrade. The thus obtained precipitate was removed by filtration and consisted of 2,842 grams of hydrocortisone which was 98.1 percent pure.

It is to be understood that the invention is not to be limited to the exact details shown and described as obvious modifications will be apparent to one skilled in the art, and the invention is therefore to be limited only by the scope of the appended claims.

We claim:

1. A process for the separation and recovery of 11β,17α,21-trihydroxy-4-pregnene-3,20-dione in a mixture with 17α,21-dihydroxy-4-pregnene-3,20-dione which comprises: dissolving said mixture in hot solvent selected from the group consisting of dichloroethylene and dichloroethylene with up to ten volume percent of methanol, cooling the solution to a temperature between about minus twenty and about plus twenty degrees centigrade and separating the thus precipitated 11β,17α,21-dihydroxy-4-pregnene-3,20-dione.

2. A process for the separation and recovery of 11β,17α,21-trihydroxy-4-pregnene-3,20-dione from a mixture resulting from the biooxidation of 17α,21-dihydroxy-4-pregnene-3,20-dione which comprises: dissolving said mixture in a solvent selected from the group consisting of dichloroethylene and dichloroethylene with up to ten volume precent of methanol at about the boiling temperature of the solution, cooling the solution to a temperature between about minus fifteen and about plus ten degrees centigrade and collecting the thus precipitated 11β,17α,21-dihydroxy-4-pregnene-3,20-dione.

3. A process for the separation and recovery of 11β,17α,21-trihydroxy-4-pregnene-3,20-dione from a mixture resulting from the oxidation of 17α,21-dihydroxy-4-pregnene-3,20-dione by microorganisms which comprises: dissolving said mixture in hot dichloroethylene using about one liter of dichloroethylene for each fourteen grams of 11β,17α,21-dihydroxy-4-pregnene-3,20-dione in the said mixture, cooling the solution to a temperature between about minus fifteen and about plus ten degrees centigrade and collecting the thus precipitated 11β,17α,21-trihydroxy-4-pregnene-3,20-dione.

4. A process for the separation and recovery of 11β,17α,21-trihydroxy-4-pregnene-3,20-dione from a mixture resulting from the oxidation of 17α,21-dihydroxy-4-pregnene-3,20-dione by microorganisms which comprises: dissolving said mixture in a hot solution consisting of dichloroethylene with up to ten volume percent of methanol using one liter of solution for each forty grams of 11β,17α,21-trihydroxy-4-pregnene-3,20-dione contained in the said mixture, cooling the solution to a temperature between about minus fifteen and about plus ten degrees centigrade and collecting the thus precipitated 11β,17α,21-trihydroxy-4-pregnene-3,20-dione.

References Cited in the file of this patent

UNITED STATES PATENTS

| | | |
|---|---|---|
| 2,602,769 | Murray et al. | July 8, 1952 |
| 2,658,023 | Shull | Nov. 3, 1953 |

OTHER REFERENCES

MacArdle: Use of Solvents in Synthetic Org. Chem., pp. 13–14 (1925).